United States Patent
McCarty et al.

(10) Patent No.: US 6,874,761 B2
(45) Date of Patent: Apr. 5, 2005

(54) PIVOT ACTUATED SLEEVE VALVE

(75) Inventors: Michael W. McCarty, Marshalltown, IA (US); Michel K. Lovell, Marshalltown, IA (US); Douglas P. Gethmann, Gladbrook, IA (US)

(73) Assignee: Fisher Controls International, St. Louis, MO (US)

( * ) Notice: Subject to any disclaimer, the term of this patent is extended or adjusted under 35 U.S.C. 154(b) by 0 days.

(21) Appl. No.: 10/842,729

(22) Filed: May 10, 2004

(65) Prior Publication Data

US 2004/0222400 A1 Nov. 11, 2004

Related U.S. Application Data

(62) Division of application No. 10/124,917, filed on Apr. 18, 2002, now Pat. No. 6,733,000.
(60) Provisional application No. 60/284,592, filed on Apr. 18, 2001.

(51) Int. Cl.$^7$ .............................................. F16K 31/00
(52) U.S. Cl. .................... 251/344; 251/235; 251/335.3
(58) Field of Search ................................ 251/344, 343, 251/325, 335.3

(56) References Cited

U.S. PATENT DOCUMENTS

| | | | |
|---|---|---|---|
| 3,654,950 A | | 4/1972 | Hamm |
| 3,804,367 A | * | 4/1974 | Johnson ...................... 251/235 |
| 3,854,557 A | | 12/1974 | Wilcox |
| 4,120,483 A | | 10/1978 | LeRoch |
| 4,589,439 A | | 5/1986 | Steingass |
| 5,020,727 A | | 6/1991 | Smith |
| 5,161,738 A | | 11/1992 | Wass |
| 5,529,281 A | | 6/1996 | Brudnicki et al. |
| 5,755,255 A | * | 5/1998 | Iwabuchi .................. 251/335.3 |
| 5,913,505 A | * | 6/1999 | Ouvrard et al. ........... 251/335.3 |
| 5,950,660 A | | 9/1999 | Hartman et al. |
| 6,116,571 A | | 9/2000 | Hettinger |
| 6,328,277 B1 | * | 12/2001 | Hanada ...................... 251/344 |
| 6,361,018 B2 | | 3/2002 | Roth et al. |
| 6,626,420 B2 | * | 9/2003 | Amidzich .................... 251/235 |

FOREIGN PATENT DOCUMENTS

| | | |
|---|---|---|
| BE | 494 736 A | 7/1950 |
| DE | 896 140 C | 2/1952 |
| GB | 791118 | 2/1958 |

* cited by examiner

*Primary Examiner*—John Bastianelli
(74) *Attorney, Agent, or Firm*—Marshall, Gerstein & Borun LLP

(57) ABSTRACT

A valve assembly has a valve body and a fluid passage through the valve body with an inlet end and an outlet end. A valve seat is defined within the fluid passage. A sleeve is axially slidable within the fluid passage and has an upstream end, a downstream end, and an axial flow passage in communication with the inlet end and the outlet end of the fluid passage. A valve stem is pivotally mounted at a stem pivot spaced radially from the fluid passage. The valve stem is actuable to slide the sleeve between an open position with the downstream end spaced from the valve seat and a closed position with the downstream end borne against the valve seat to selectively control fluid flow through the flow passage to the outlet end.

8 Claims, 14 Drawing Sheets

US 6,874,761 B2

PIVOT ACTUATED SLEEVE VALVE

RELATED APPLICATION DATA

This patent is related to and claims the priority benefit of division of U.S. utility patent application Ser. No. 10/124,917, now U.S. Pat. No. 6,733,000 which was filed on Apr. 18, 2002, and which is based on U.S. provisional Patent Application Ser. No. 60/284,592, which was filed on Apr. 18, 2001.

FIELD OF THE INVENTION

The invention is generally related to fluid valves, and more particularly to a sleeve valve that is pivot actuated.

BACKGROUND OF THE INVENTION

Conventional fluid valves are typically of the rotary stem or sliding stem type. A rotary valve for fluid service incorporates a rotary shaft held in a cylinder of a valve body. The shaft, upon rotation, either aligns a radial port of the shaft with a fluid port of the valve body to open a valve passage, or mis-aligns the ports to close the valve passage. In operation, the typical rotary valve stem must rotate about 90 degrees relative to the valve body between the fully open and closed positions. Other types of rotary valve designs are available that utilize alternative geometries requiring shaft rotation that is less than 90 degrees, such as three way or angled ball valves. Rotary valves typically employ seals, and often bearings, between the rotary shaft and valve body to prevent fluid from leaking from the valve body between the shaft and its cylinder. This significant movement causes substantial wear to both the seals and, if present, the bearings. Thus, the bearings and seals of such a valve must be replaced over time. The seals, in order to function properly, also add friction between the cylinder and stem. Substantial force is therefore necessary to overcome the seal friction and to rotate the stem.

A sliding stem valve operates similar to a piston and has a valve plug on a stem that slides linearly within a cylinder of a valve body. The valve plug bears against a seat or closes a passage when closed, and is spaced from the seat or clears the passage when open. Again, the valve stem and valve plug must move relative to the cylinder of the valve body a significant distance between the fully open and closed positions. Sliding stem valves typically employ seals, and often guides, between the stem and valve body to prevent fluid from leaking from the valve body between the stem and its cylinder. The significant linear movement of the valve body causes wear on the seals, and if present, the bearings, and thus the seals and bearings must be replaced over time. The seals also create friction that must be overcome in order to move the linear stem valve between the open and closed positions.

BRIEF DESCRIPTION OF THE DRAWINGS

Exemplary sleeve valves constructed in accordance with the teachings of the present invention are described and explained in greater detail below with the aid of the drawing figures in which.

DETAILED DESCRIPTION OF THE PREFERRED EMBODIMENTS

It is one object of the present invention to provide a valve that solves one or more of the problems described above for the rotary valve and linear stem valve. It is another object of the present invention to provide a fluid valve that utilizes a pivoting action in order to actuate the valve. It is a further object of the present invention to provide a sleeve valve that incorporates such a pivoting action. It is a still further object of the present invention to provide a fluid valve wherein mechanical advantage can be easily incorporated and manipulated to provide the valve seating force as necessary.

Figure 1:
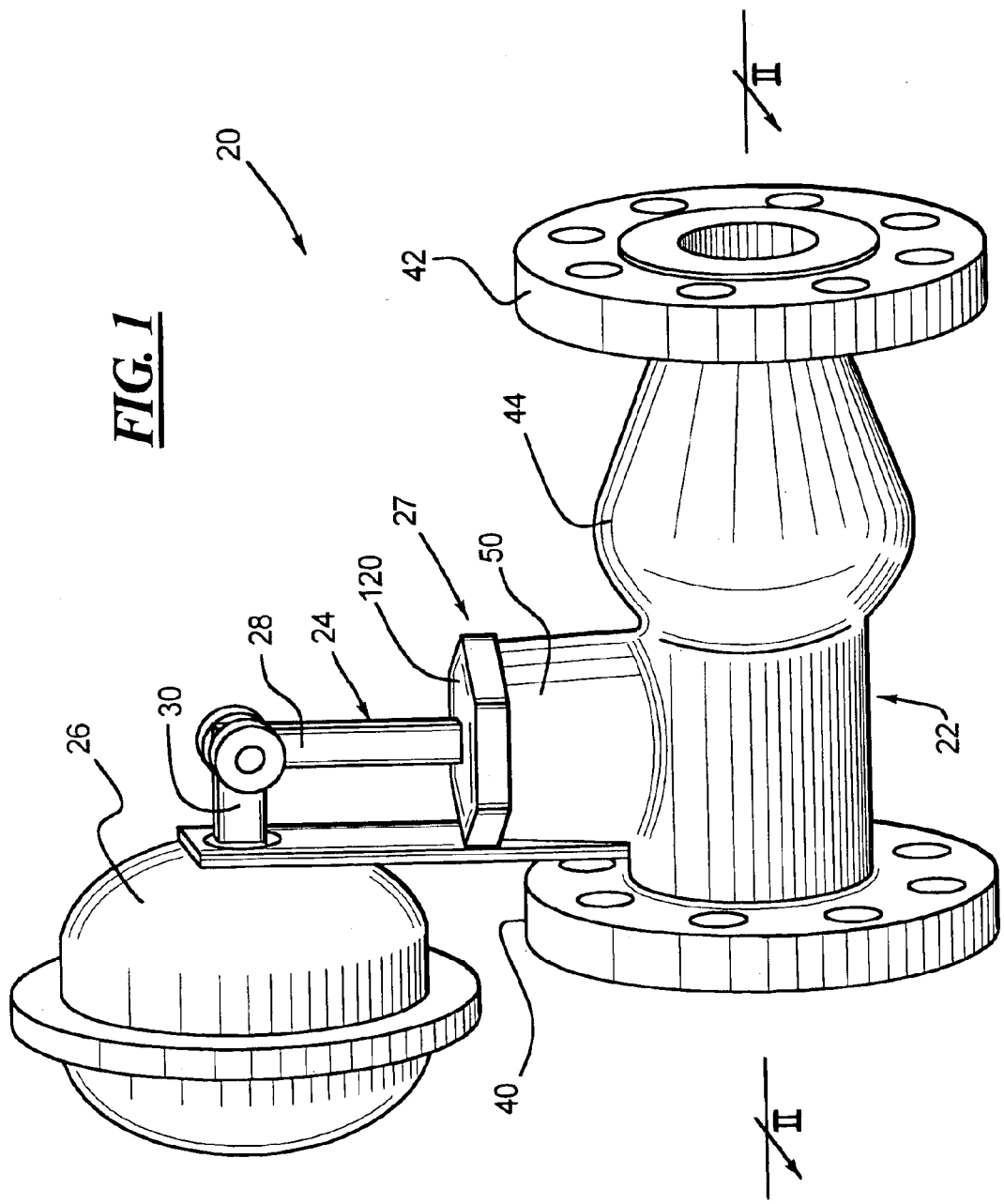
FIG. 1 is a perspective view of one example of a sleeve valve constructed according to the teachings of the present invention.
Figure 2A:
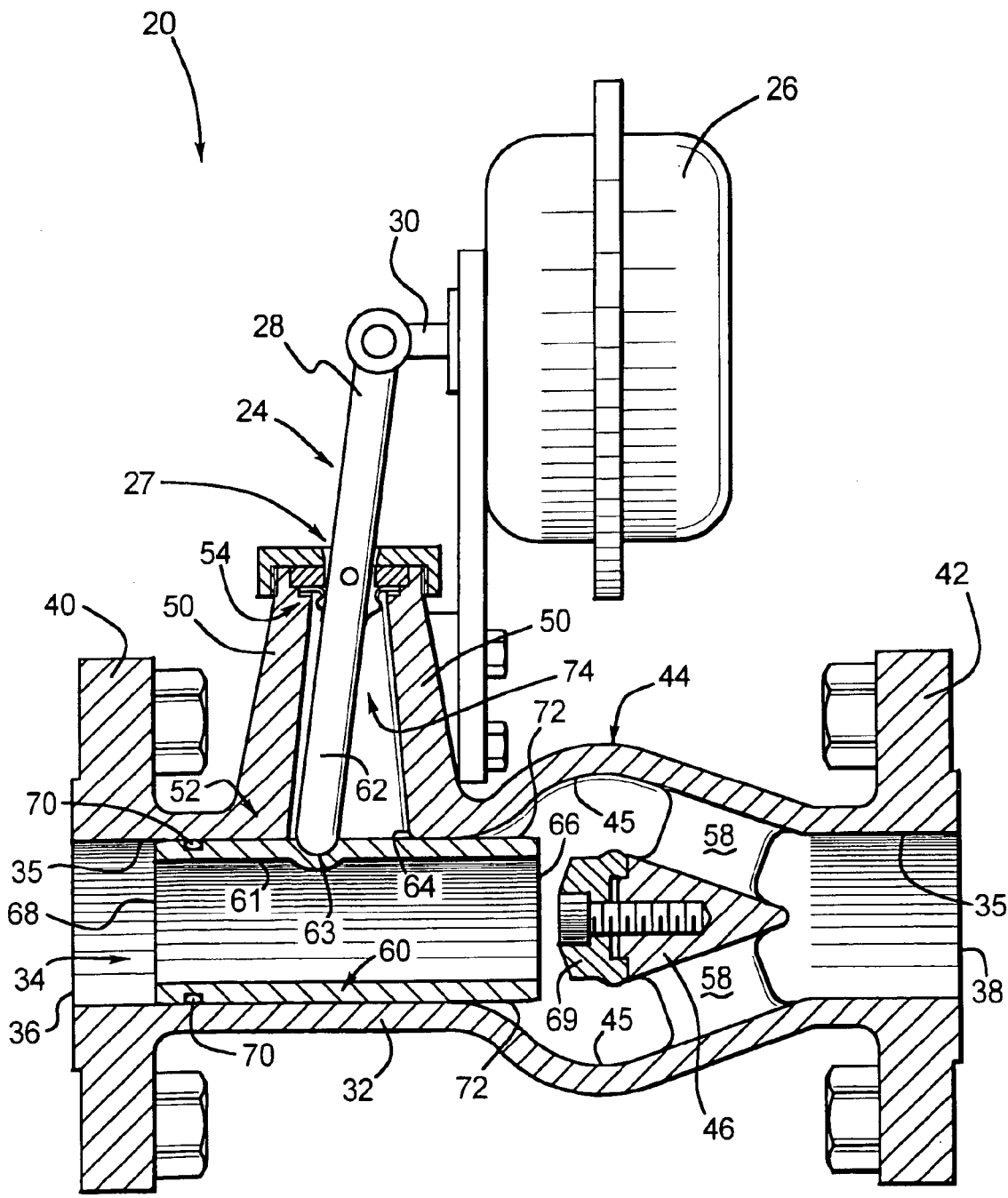
FIG. 2A is a longitudinal cross section taken along line II—II of the valve shown in FIG. 1 and showing the valve in an open position.
Figure 2B:
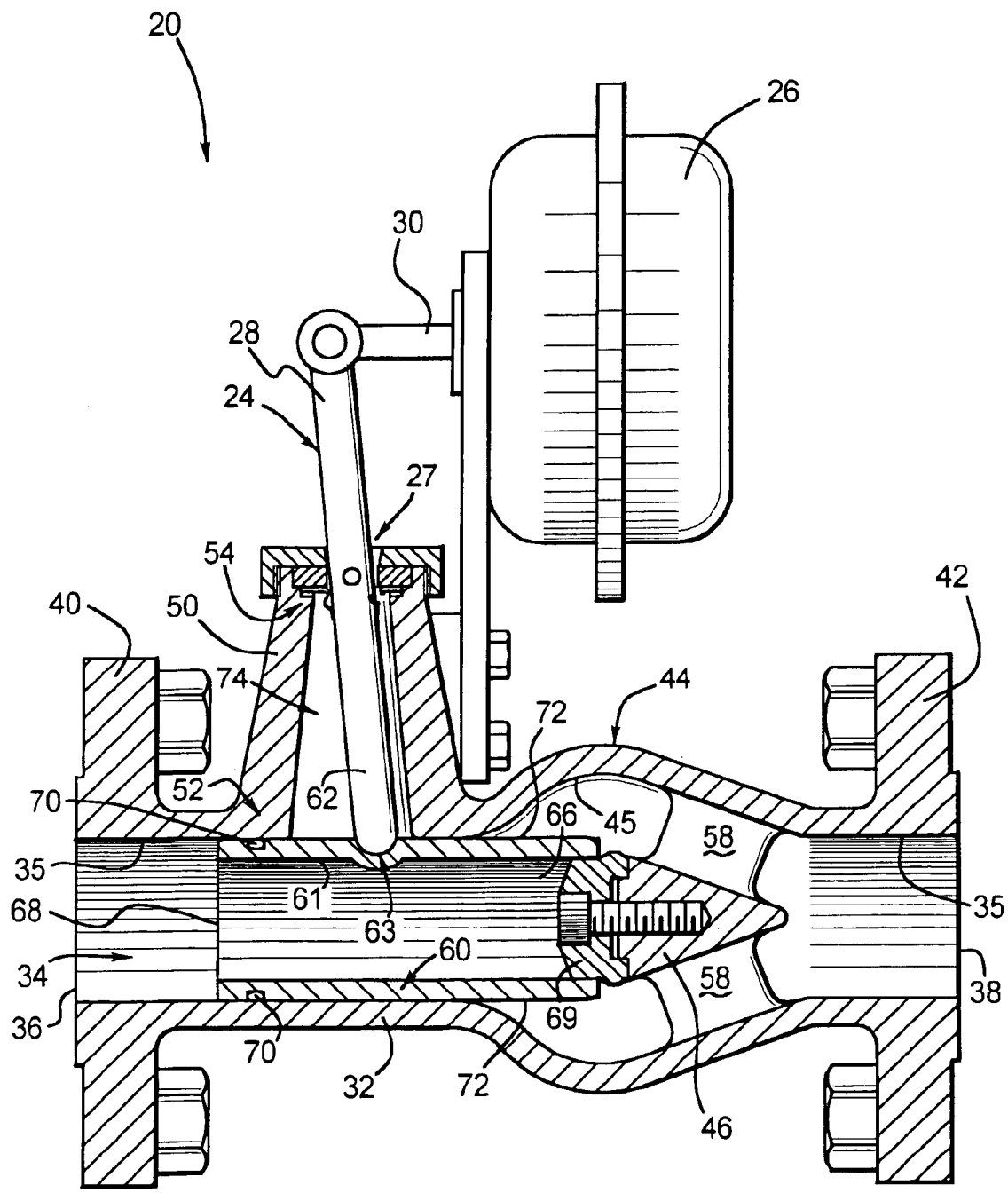
FIG. 2B is a cross section of the valve shown in FIG. 2 and showing the valve in a closed position.

Referring now the drawings, FIG. 1 illustrates one example of a sleeve valve 20 in perspective view and constructed according to the teachings of the present invention. The sleeve valve 20 is generally illustrated in FIGS. 1, 2A, and 2B and has a valve body 22 and a pivoting valve stem 24 for actuating the valve between open and closed positions as described below. The valve stem 24 is pivoted by an actuator 26 about a stem pivot 27. The actuator 26 is coupled to an upper stem section 28 of the valve stem 24 above the stem pivot 27. The actuator 26 can vary considerably and yet fall within the scope of the present invention. In one example, the actuator 26 has a reciprocating rod 30 that can move axially according to movement of a diaphragm, electric motor, linkage, or the like, as desired for a particular application.

The valve body 22 generally has an elongate hollow section 32 defining a fluid passage 34 that extends through and is defined by an interior surface 35 within the valve body between an inlet end and an outlet end of the body. The valve body 22 defines an inlet 36 to the passage 34 and an outlet 38 from the passage. The inlet end and the outlet end of the valve body 22 each include a mounting shoulder or flange 40 and 42, respectively, for securing the valve 20 in place within a desired apparatus or system. Both the inlet and outlet flanges 40 and 42 can vary in size and configuration as needed for a particular use of the sleeve valve 20.

A portion of the hollow section 32 of the valve body 22 defines an annular bulge 44 extending radially outward from the hollow section 32. The bulge 44 produces an increased diameter section 45 within the valve passage 34 that encompasses a stationary valve plug 46. The valve plug 46 is positioned axially within the passage 34 to longitudinally coincide with the bulge 44 and passage section 45. The valve plug is held stationary within the passage 34 by one or more webs 58 or other securing device that extend between the valve body and valve plug. In the disclosed example of FIGS. 1, 2A, and 2B, the valve plug 46 and webs 48 are integrally formed as a unitary part of the valve body 22 within the passage 34. Alternatively, the valve plug 46 can be secured in place such that it can be removed as desired. In one example, the valve plug 46 can be secured by removable fasteners to ribs or webs of the valve body. In a further alternative, the valve plug 46 can itself be threaded in place onto a portion of the valve body 22. In some embodiments of the valve 20, it may be desirable to remove the valve plug 46 to service the plug or plug components for wear, or to remove and replace the valve plug with another plug having different characteristics. Removably installing the plug 46 will permit such service or replacement.

The size of the valve plug will determine the size of the bulge 44 and increased diameter passage section 45. The general cross sectional flow area of the passage 34 downstream of the valve plug (nearer the outlet 38) and the cross sectional flow area of the passage within the increased diameter section 45 (around the plug 46) is preferably greater than or equal to the cross sectional flow area of the passage upstream of the valve plug (nearer the inlet 36). This is done to insure that fluid flow is not restricted by the valve body, but only at the desired throttling area about the sleeve and plug. The bulge 44 and passage section 45 provide the additional cross sectional flow area for the passage 34 around the valve plug 46 to accomplish this goal.

The valve body 22 also has an integral stem housing 50 extending radially outward from the hollow section 32. The stem housing 50 has a base 52 either integrally formed as part of the hollow section 32 of the valve body 22, or, if desired, attached and fluidly sealed thereto. The stem housing 50 extends radially outward and terminates at a pivot end 54 opposite the base 52. The stem housing 50 defines the stem pivot 27 for the stem 24 at or near the pivot end 54 as described below. The stem housing 50 is therefore necessarily substantially rigid to maintain a fixed pivot point for the stem.

The sleeve valve 20 also includes a slidable sleeve 60 in the form of an annular or cylindrical tube with an interior surface 61 that defines a flow passage through the sleeve. The sleeve 60 is received coaxially within the passage 34 and is adapted for sliding into and out of engagement with the stationary valve plug 46. In general, the valve stem 24 has a lower stem section 62 that is pivotally connected to the sleeve 60 at a drive connection 63. The lower stem section 62 drives the sleeve axially within the passage 34 between an open position as shown in FIG. 2A and a closed position as shown in FIG. 2B. The lower stem section 62 is pivotally coupled to the sleeve 60 for driving the sleeve axially within the passage 34. The lower stem section 62 passes through an opening 64 defined within the base 52 and the hollow section 32. The opening 64 can be a linear slot permitting only linear, axial movement of the lower stem section 62. Alternatively, the opening 64 can be an opening through the hollow section 32 that is shaped to coincide with the entire footprint of the base 52 of the stem housing 50. The opening can also be other sizes and shapes as desired.

As shown in FIG. 2A, the sleeve 60 is positioned in the open orientation. The sleeve 60 has a downstream end 66 generally facing the outlet 38 of the passage 34, and has an upstream end 68 generally facing the inlet 36 of the passage. In the open orientation, the downstream end 66 is spaced a distance from the stationary valve plug 46 permitting fluid to freely pass through the passage 34 and the sleeve 60, flowing around the valve plug and out the outlet 38 of the passage. FIG. 2B illustrates the sleeve 60 in the closed orientation wherein the downstream end 66 abuts and seals against the stationary valve plug 46. A seal 69 can be provided on either the sleeve downstream end 68 or the valve plug 46. Fluid is prevented from passing to the outlet 38 of the passage 34 by the valve plug 46, the sleeve 60, and seal 69.

If desired, one or more sleeve seals 70 can provide a fluid tight, or at least a fluid inhibiting, seal between the interior surface 35 of the passage 34 and an exterior surface 72 of the sleeve 60. Depending upon the longitudinal length of the sleeve 60, the sleeve can prevent fluid from passing through the opening 64 into an interior 74 of the stem housing 50, whether in the open or the closed orientation. A fluid tight seal 70 can be used to prevent fluid from entering the interior 74 of the housing 50. If the sleeve seals 70 are simply fluid inhibiting seals, some fluid may pass into the interior 74 of the stem housing. With such a construction, it is preferable to further seal between the stem 24 and the pivot end 54 of the stem housing, as described in greater detail below, in order to prevent any fluid from escaping the valve 20. With either type of seal 70, it is desired that no process fluid leak downstream to the outlet 38, bypassing the sleeve 60, until the sleeve is released from the plug 46. Various types of sleeve seals 70 are known to those of ordinary skill in the art and can be utilized without departing from the scope of the invention.

Figure 3:
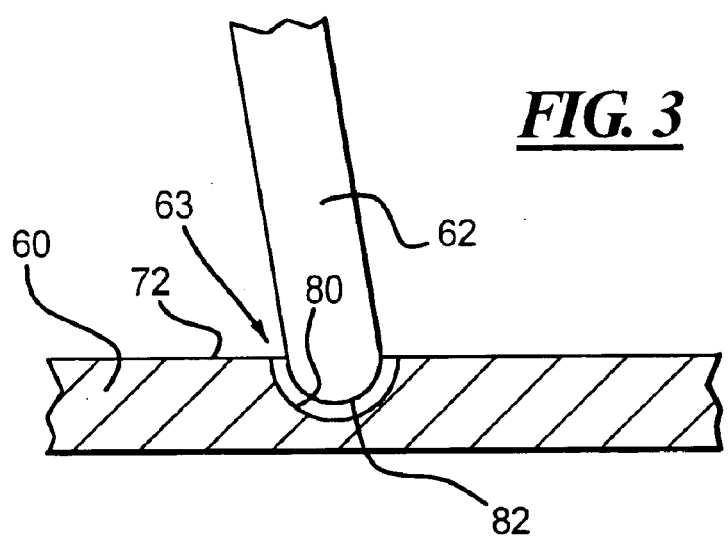
FIG. 3 is a side view in partial cross section of one example of a valve stem and sleeve arrangement constructed according to the teachings of the present invention.
Figure 4:
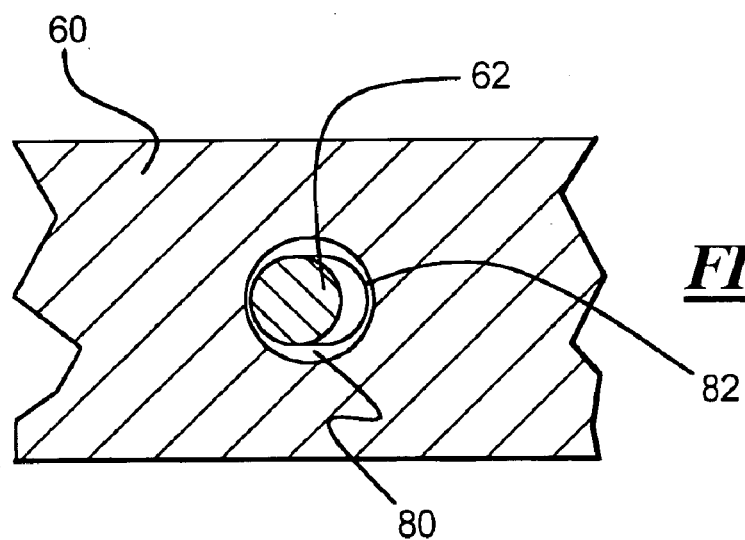
FIG. 4 is a top view of the valve stem and sleeve arrangement of FIG. 3.

FIGS. 3–10B illustrate a number of alternative embodiments for the drive connection 63 between the lower stem section 62 and the sleeve 60. Referring first to FIGS. 3 and 4, one example of the drive connection 63 is illustrated. In this example, the exterior surface 72 of the sleeve includes a socket or depression 80 formed therein. The lower stem section 62 includes a rounded end 82 that closely follows the contour of the socket 80 and is received therein. The rounded end 82 and socket 80 therefore form a ball and socket joint permitting pivotal movement of the lower stem section 62 relative to the sleeve 60 as the sleeve is driven axially along the passage 34 by the stem 24. The rounded end 82 on the lower stem section 62 can be integrally provided on the stem or can be a ball or element having a semi-spherical surface that is attached to the stem.

Figure 5:
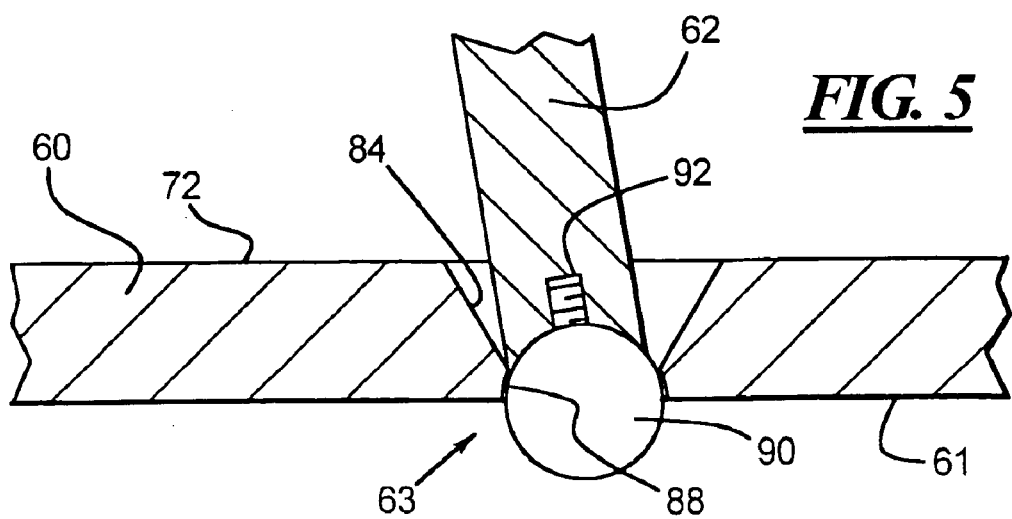
FIG. 5 is a side view in partial cross section of another example of a valve stem and sleeve arrangement constructed according to the teachings of the present invention.

FIG. 5 illustrates another alternative embodiment of the drive connection 63 between the lower stem section 62 and the sleeve 60. In this disclosed example, the exterior surface 72 of the sleeve 60 includes a tapered opening 84. The interior surface 61 of the sleeve 60 includes a socket 88 that is co-axially aligned with the tapered opening 84. Together, the combined socket 88 and tapered opening 84 pass completely through the sleeve 60. A ball 90 is disposed on the lower end of the lower stem section 62 in this example. Again, the ball 90 can be attached in any suitable manner to the lower stem section 62, or can be integrally provided thereon. For example, a discrete ball 90 can have a threaded stud 92 that is received in a corresponding opening in the lower stem section 62. The drive connection 63 illustrated in FIG. 5 essentially provides a ball and socket joint adjacent the interior surface 61 of the sleeve 60 and permits the lower stem section 62 to pivot within the tapered opening 84.

Figure 6:
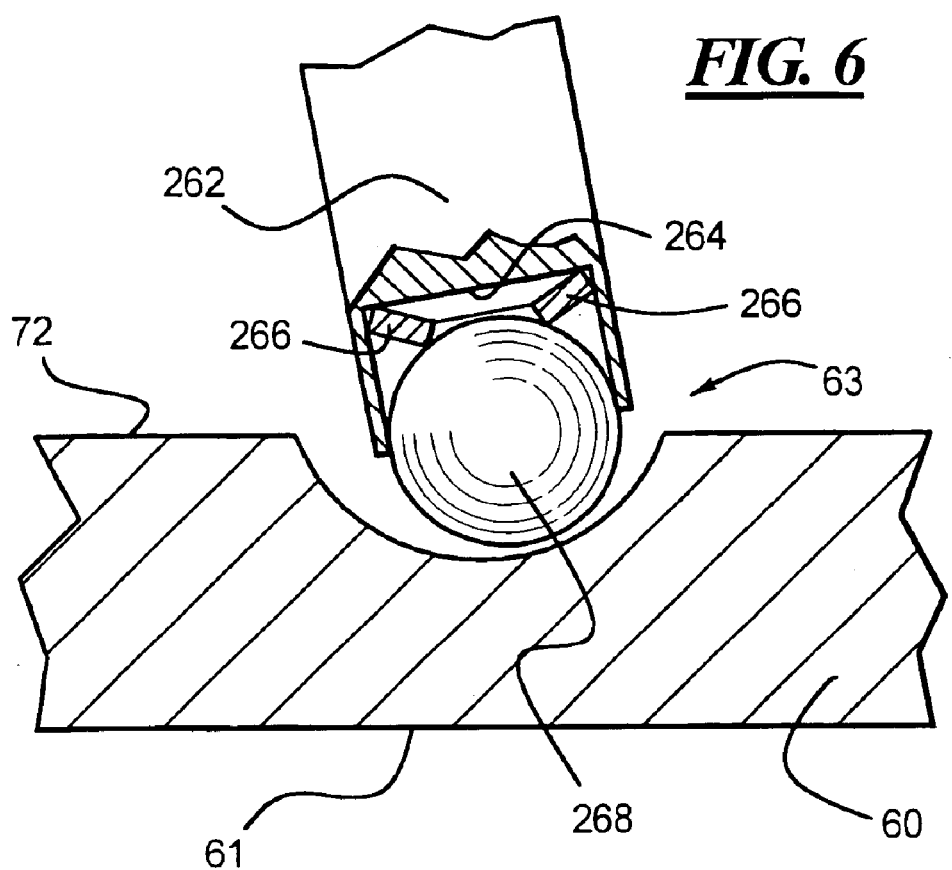
FIG. 6 is a side view in partial cross section of another example of a valve stem and sleeve arrangement constructed according to the teachings of the present invention.

FIG. 6 generally shows a drive connection 63 similar to that shown in FIG. 3. In most instances, the pivot action of the stem 24 will produce a travel arc at the lower end of the lower stem section 62. Hence, the vertical (with reference to the drawing orientation) position of the stem will vary during operation. Since the sleeve 60 is stationary in the vertical direction, this travel arc must be accommodated.

FIG. 6 also illustrates a lower stem section 262 with a blind bore 264 formed axially into the lower end. A Belville washer 266 is positioned in the blind bore 264 and biases a ball 268 downward. The ball is permitted to move vertically within the blind bore as the stem pivots to accommodate this travel arc of the lower stem section 262.

Figure 7:
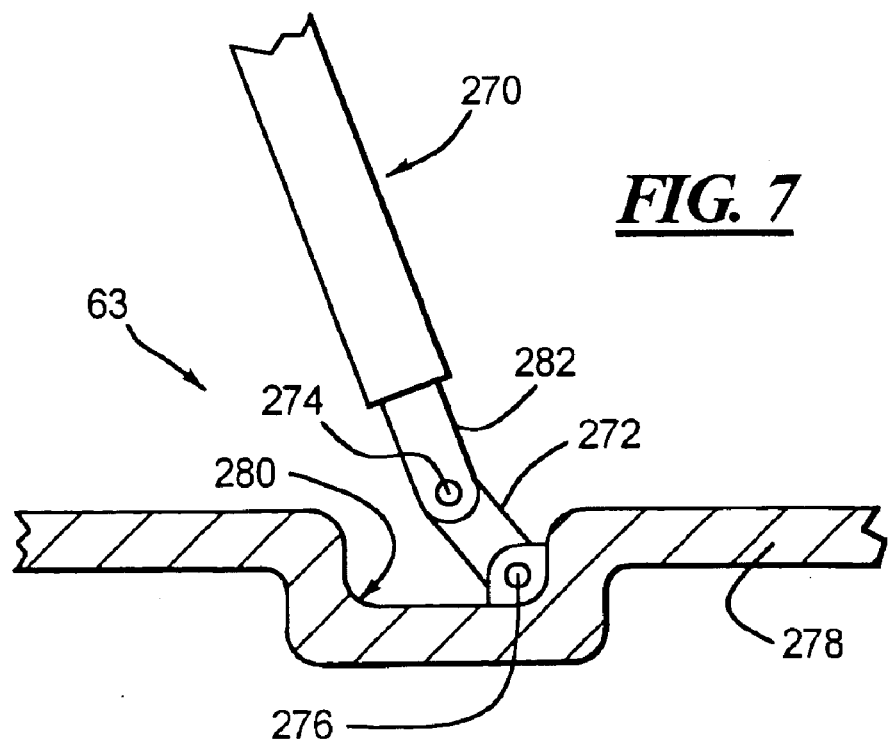
FIG. 7 is a side view in partial cross section of another example of a valve stem and sleeve arrangement constructed according to the teachings of the present invention.

FIG. 7 shows another example of a drive connection 63 adapted to accommodate for the travel arc of the lower stem section. In this example, a lower stem section 270 has a lower end coupled with a link 272 pivotally connected via a first pivot 274 at one end to the lower end of the stem section 270. The link 272 is also pivotally connected at a second pivot 276 to a sleeve 278. The sleeve 278 has a trough 280 formed therein permitting the link 272 and stem section 270 to move vertically relative to the sleeve 278. In this example, the link 272 is coupled to the lower end of the stem section by a fixed link 282. The link 282 is threadingly received in the lower end of the stem section 270 and carries the first pivot 274. The first pivot 274 can alternatively be carried directly on the lower end of the stem section 270, if desired. As will be evident to those having ordinary skill in the art, other constructions and arrangements are also possible for accommodating the travel arc of the stem (see FIGS. 10A and 10B below).

Figure 8:
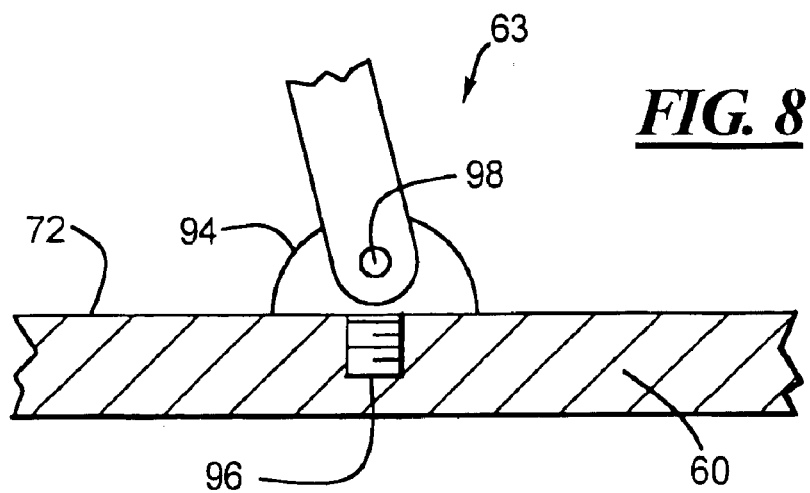
FIG. 8 is a side view in partial cross section of another example of a valve stem and sleeve arrangement constructed according to the teachings of the present invention.

FIG. 8 illustrates another alternative example of a drive connection 63. In this example, a clevis 94 is secured to the exterior surface 72 of the sleeve 60 in a suitable manner. As disclosed in this example, the clevis 94 has a threaded stud 96 extending therefrom that is received in a corresponding bore provided in the exterior surface of the sleeve. A pivot pin 98 extends transversely through the lower stem section 62 near the bottom end. The pivot pin 98 is pivotally secured to a portion of the clevis 94. The lower stem section 62 pivots about the clevis 94 at the pin 98. To accommodate the travel arc of the stem 24, the clevis pivot pin openings can be slotted to permit vertical travel of the lower end of the stem relative to the sleeve.

Figure 9A:
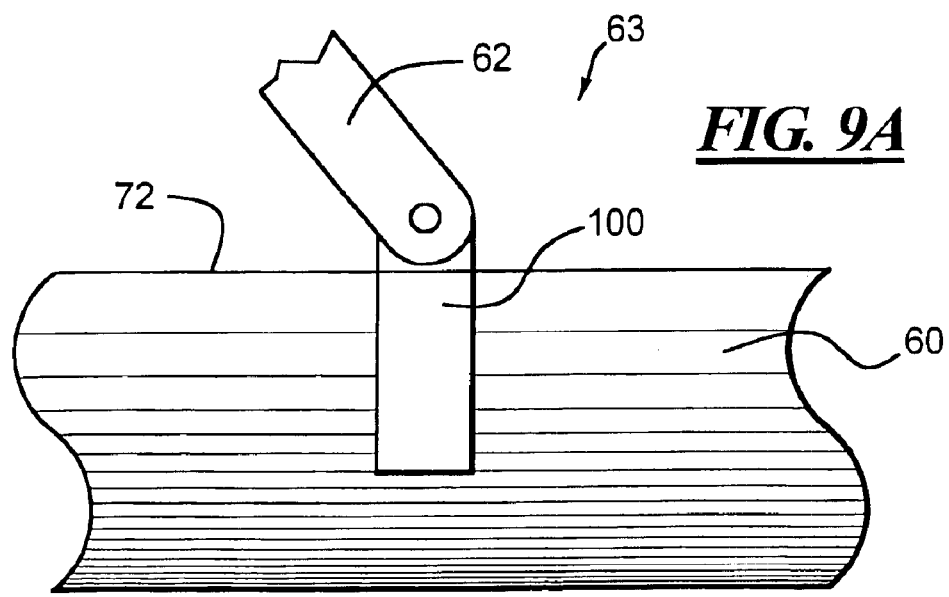
FIG. 9A is a side view in partial cross section of another example of a valve stem and sleeve arrangement constructed according to the teachings of the present invention.
Figure 9B:
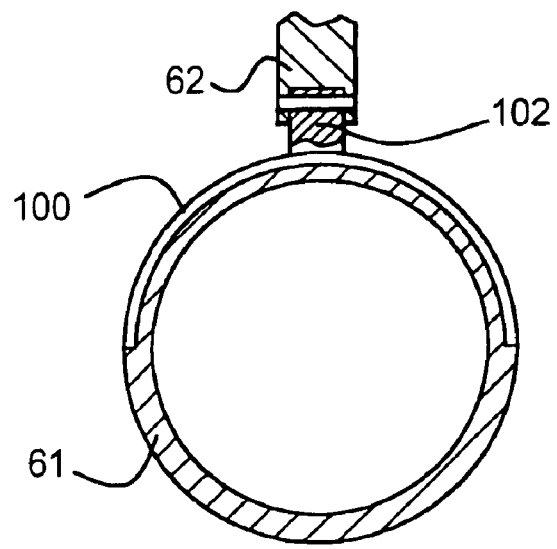
FIG. 9B is an end view of the valve stem and sleeve arrangement shown in FIG. 9A.

FIGS. 9A and 9B illustrate another alternative example of a drive connection 63 between the sleeve 60 and the lower stem section 62. In this example, a wishbone shaped element or section 100 is provided on a portion of the sleeve and is oriented in a plane generally normal to the sleeve axis. The wishbone section 100 can alternatively be formed integral as a part of the sleeve. The wishbone in this example is secured to or formed integral with a portion of the interior surface 61 of the sleeve 60. The wishbone section 100 can also provided on the exterior surface 72, if certain flow characteristics within the sleeve are of importance. The wishbone section 100 extends partly around the circumference of the sleeve. Located centrally relative to the wishbone section 100 and extending upward relative to the sleeve is a trunnion 102 pivotally connected to the lower end of the lower stem section 62. The trunnion 102 can also be in a form similar to the clevis 94 and can be attached by a pivot pin (not shown) to the lower stem section 62 forming the pivotable drive connection 63. The trunnion pin openings can be slotted to accommodate the stem travel arc.

As will be evident to those of ordinary skill in the art, the drive connection 63 at the lower stem section 62 and sleeve 60 can utilize many different constructions and components. The intended function of the drive connection 63 is to permit the lower stem section 62 to pivot relative to the sleeve so that the stem 24 can pivot and yet can linearly drive the sleeve within the passage 34. Also, each of the disclosed examples can vary from the specific form shown in the pertinent FIGS. 3–9B and yet fall within the scope of the invention.

Figure 10A:
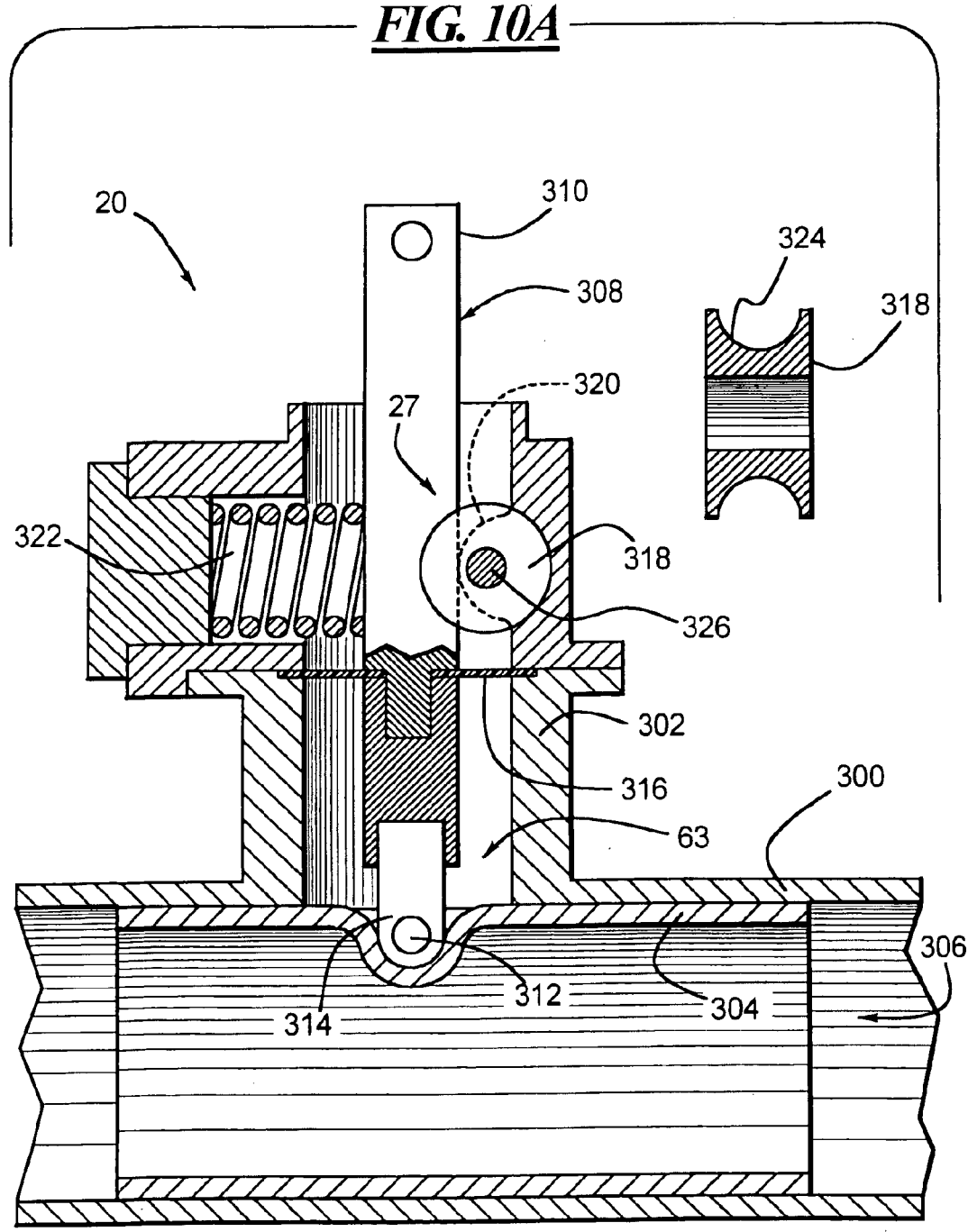
FIG. 10A is a side view in partial cross section of another example of a valve stem and sleeve arrangement constructed according to the teachings of the present invention.
Figure 10B:
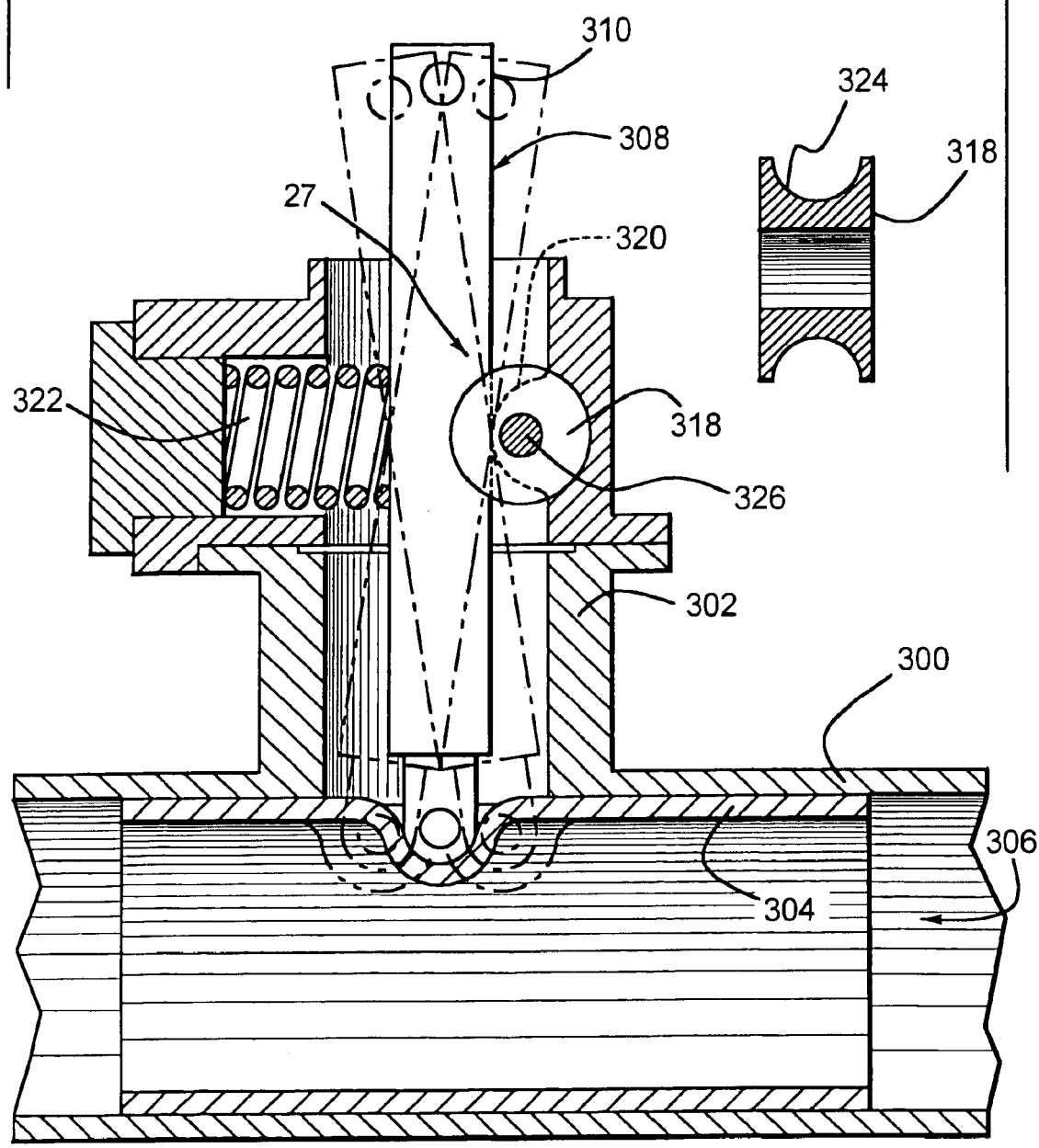
FIG. 10B is a side view in partial cross section of the valve and sleeve arrangement of FIG. 10A during actuation.

FIGS. 10A and 10B further illustrate the variety of constructions that can be used to form the drive connection and to accommodate the travel arc of the stem. FIG. 10A illustrates a valve 20 having a valve body 300 similar to the valve body shown in FIG. 1. A stem housing 302 is provided extending from a portion of the body 300. A sleeve 304 is received in a passage 306 similar to the valve in FIG. 1. A valve stem 308 is connected at a top end 310 to an actuator (not shown) for drivingly pivoting the stem. A lower end of the stem 308 is pivotally coupled at a first pivot 312 via a clevis 314 to the sleeve 304. A boot or seal 316 is sealingly secured around a portion of the lower stem 308 and is clamped between portions of the stem housing 302 to form a process fluid barrier within the housing 302.

A generally mid-portion of the stem 308 bears against a fulcrum or roller 318 held on an interior wall 320 of the housing. A biasing element such as a coil spring 322 biases the stem against the fulcrum at all times. The fulcrum provides a stem channel 324 in its exterior surface to laterally retain the stem in position. The fulcrum can either be fixed and provide a low friction bearing surface for the stem, or can be a roller bearing that is free to rotate about a pivot 326.

As shown in FIG. 10B, as the stem is driven, it pivots or wobbles about the fulcrum 318, and at the same time rolls or slides vertically along the fulcrum. The clevis 312 and first pivot 314 travel along a linear path. The stem 308 therefor will rise and fall slightly relative to the fulcrum 318. The stem can slide along the fulcrum within the channel 324 during operation to accommodate the travel arc of the stem. In the previously described examples, the lower end of the stem provided this relative vertical movement between stem and sleeve. In the example of FIGS. 10A and 10B, the stem pivot 27 provides this relative movement.

Figure 11:
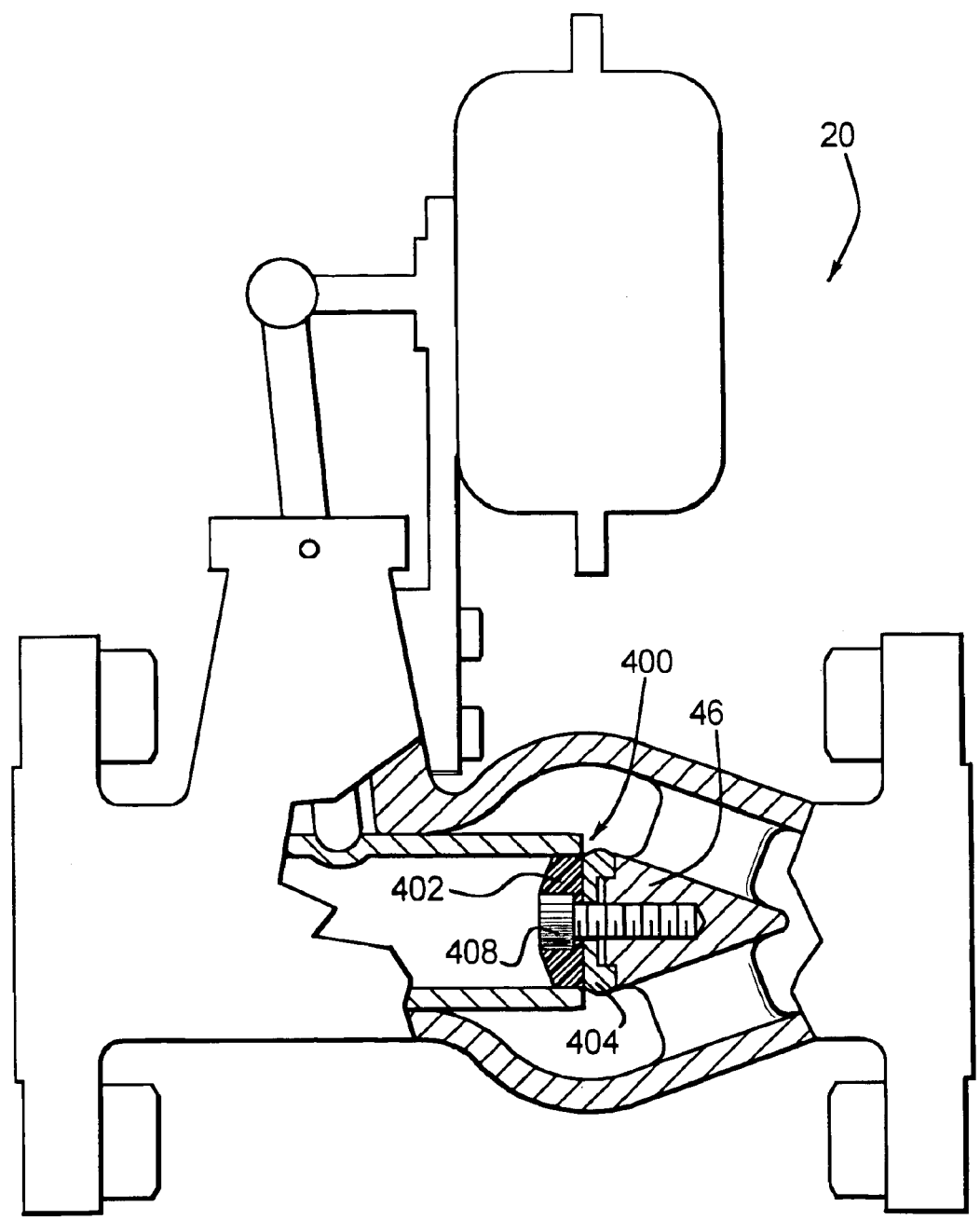
FIG. 11 is a side view in partial cross section of the valve shown in FIG. 2 and having an alternative valve plug configuration.

FIGS. 11–14 disclose several different examples of the valve plug and sleeve seal arrangement. Special service valve plugs, such as for noise attenuation, cavitation protection, or "soft seat" (TEFLON®) seal provision can require such service or replacement. The valve plug 46 as described above can be removably installed in the passage 34 permitting service or replacement of such valve designs. FIG. 11 shows a valve 20 with a valve plug 46 having an added soft seat construction. The plug 46 includes a replaceable tip 400 having a plastic or elastomeric seat 402 received over the upstream end of the plug 46. The seat 402 is held in place on a retainer 404 by a removable fastener 408. The seat material can be selected to meet certain material standards and/or tight seating characteristics.

Figure 12:
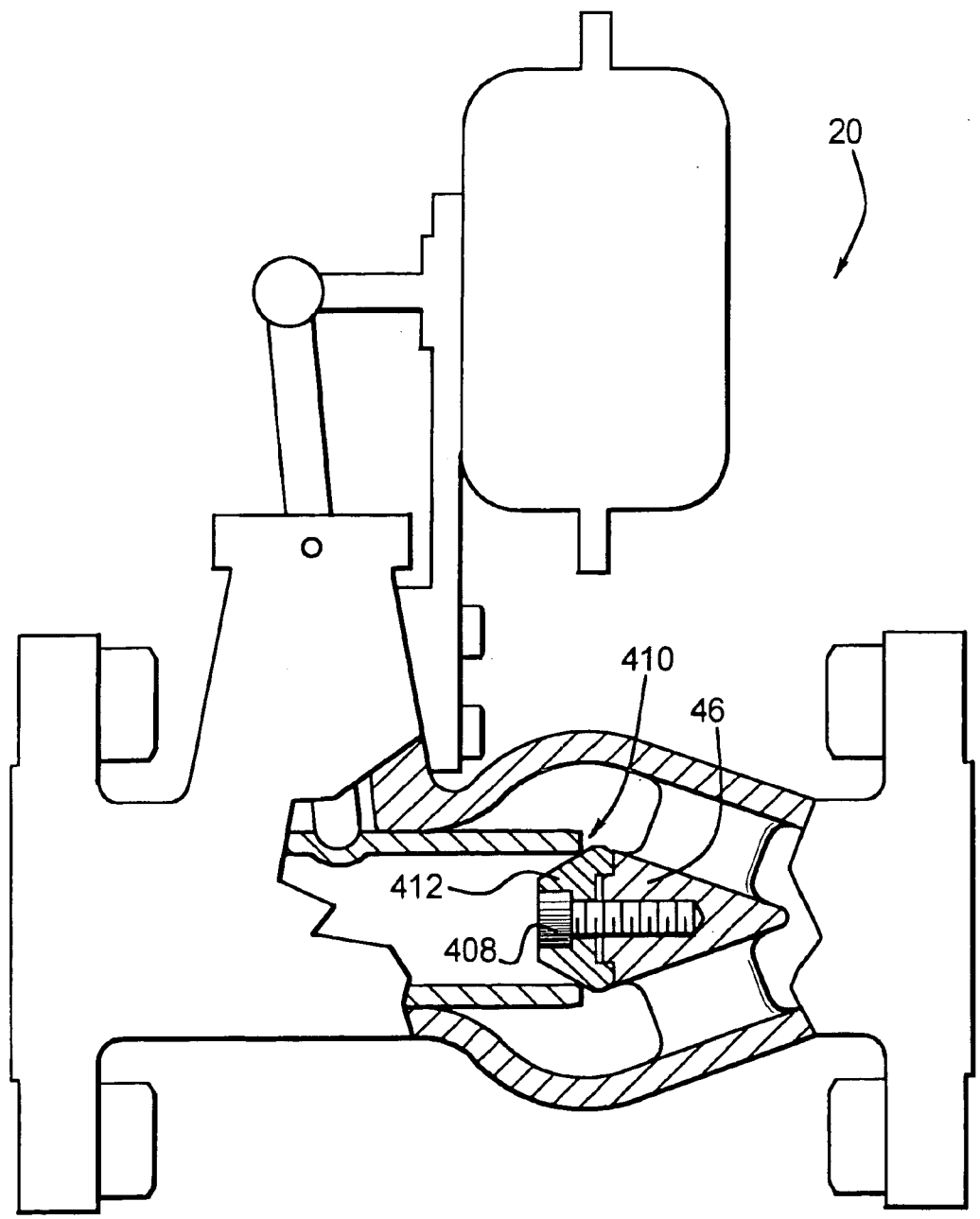
FIG. 12 is a side view in partial cross section of the valve shown in FIG. 2 and having another alternative valve plug configuration.

FIG. 12 shows an alternative replaceable tip 410 having a seat 412 of a different configuration held in place by the fastener 408. The tapered seat 412 may be desired to provide better or different process fluid flow characteristics.

Figure 13:
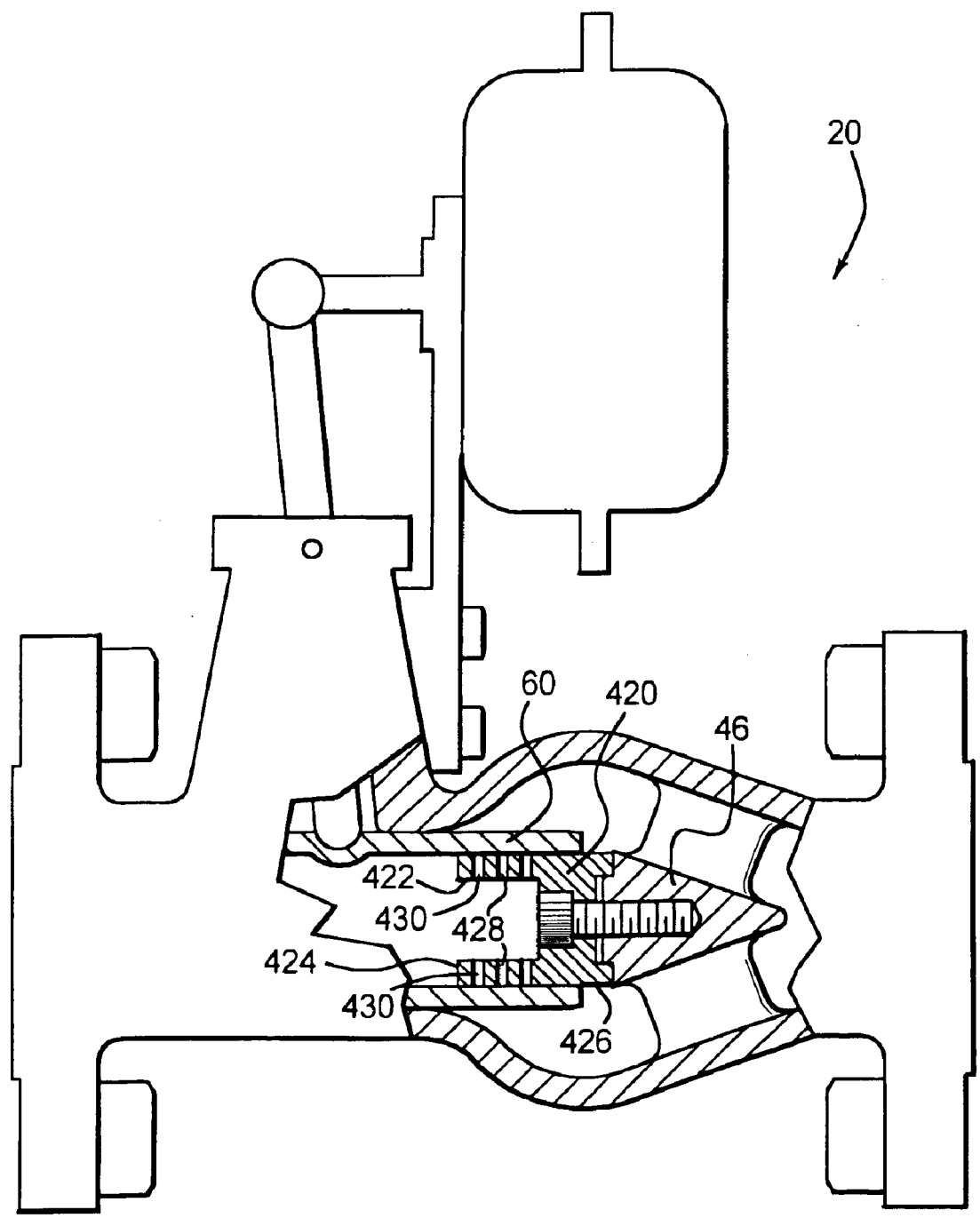
FIG. 13 is a side view in partial cross section of the valve shown in FIG. 2 and having another alternative valve plug configuration.

FIG. 13 shows another example of an alternative valve plug including an attachment fitting or end 420. The plug end 420 has a cylindrical configuration with a center bore 422, an annular wall 424, and an exterior surface 426. The exterior surface 426 has a diameter such that it can be received and closely fit within the interior of the sleeve 60. A first set of radial openings 428 are provided and spaced apart circumferentially around the plug end 420. A second set of openings 430 are also provided circumferentially around the plug end 420, but longitudinally spaced upstream from the first set 428. Additional sets of openings can also be provided as desired. The openings 428 are exposed and opened first during travel of the sleeve 60 toward the inlet end (open position). Process fluid can first pass only through the openings 428. As the sleeve is moved further toward the open position, the next set or sets of openings 430 become sequentially open. The sleeve and plug can be design to only expose the radial openings when the sleeve is in the fully open position. Alternatively, the outlet end of the sleeve can release and move further away from the plug 46 when in the open position to permit free flow through the sleeve and around the entire plug 420. By this example, various flow characteristics can be achieved as desired, depending upon the position of the sleeve relative to the plug.

Figure 14:
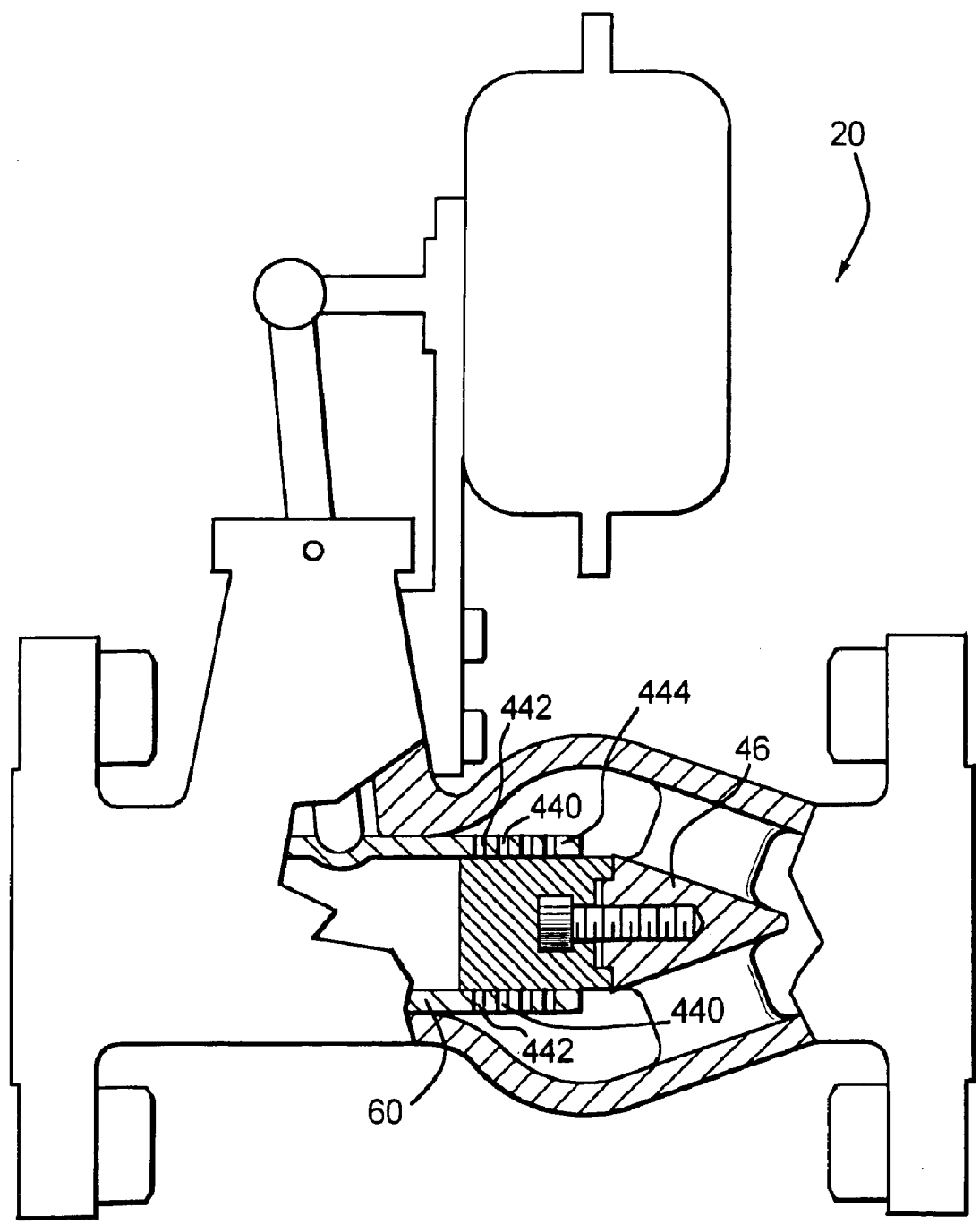
FIG. 14 is a side view in partial cross section of the valve shown in FIG. 2 and having alternative sleeve and valve plug configurations.

FIG. 14 shows a similar plug end and sleeve configuration except that radial openings 440 and 442 are formed in the sleeve near its outlet end. A plug fitting or end 444 in this example is a solid cylinder adapted to be received in and closely fit the interior of the sleeve. The solid plug will sequentially open or close off the openings 440 and 442, depending upon the sleeve position within the passage.

FIGS. 15–18 illustrate a number of different disclosed examples of the stem pivot 27 between the valve stem 24 and the pivot end 54 of the stem housing 50. In each of the these examples, the valve stem 24 is intended to pivot about a point defined generally at the pivot end 54 of the stem housing 50. This stem pivot 27 is preferably sealed so that any process fluid passing into the interior 74 of the stem housing 50 does not weep or leak from the valve body 22. It is also preferable that the stem pivot 27 between the valve stem 24 and the stem housing 50 be a friction-less or a low friction joint. The valve stem 24 in any of the disclosed examples herein can either be a single integral stem incorporating both the lower stem section 62 and upper stem section 28, or can be formed of two separate stem sections interconnected with one another.

Figure 15:
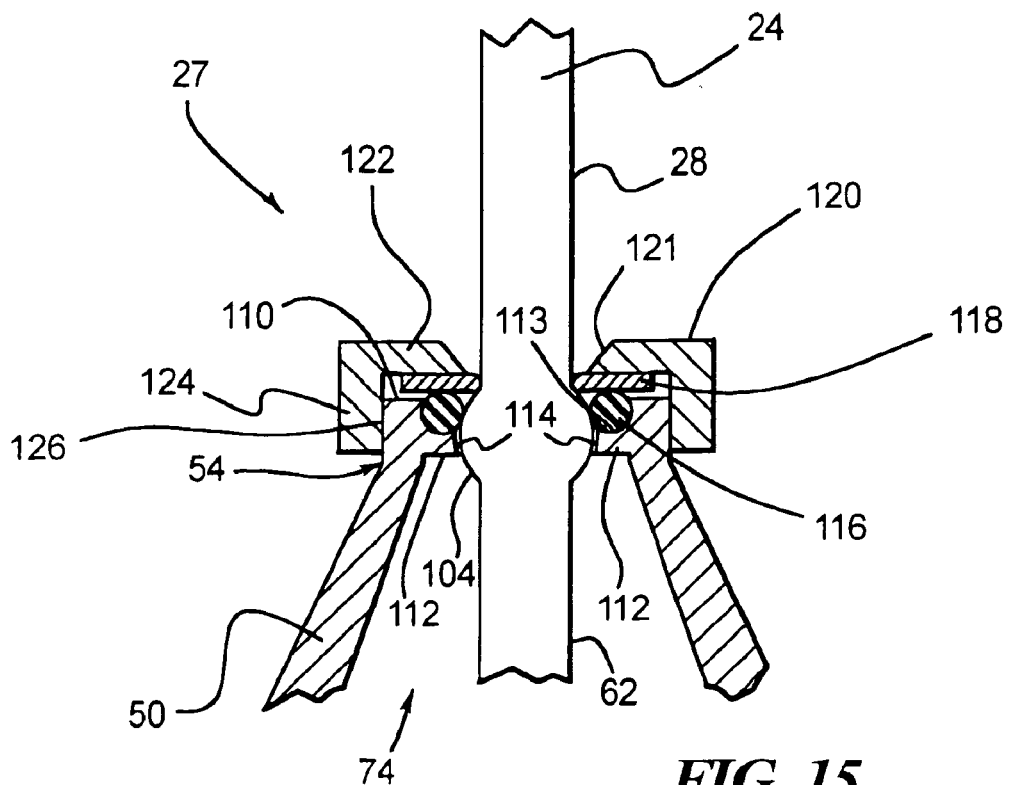
FIG. 15 is a side view in partial cross section of one example of a valve stem pivot arrangement constructed according to the teachings of the present invention.

As illustrated for the stem pivot 27 disclosed in FIG. 15, the valve stem 24 has a radial bulge or an enlarged diameter portion relative to the remainder of the stem. The bulge has a partial circular contour forming a pivot ball 104 on the stem. The stem housing 50 has a frusto-conical shape terminating at an annular upwardly extending lip 110. An inwardly extending annular flange 112 is disposed just below the top of the lip 110 and defines a stem opening 114 into the stem housing. The flange 112 also has a top surface that forms a ledge 113. In this example, the inward facing surface of the flange 112 is curved to form a socket or seat for the ball 104 of the stem 24.

An O-ring seal 116 rests on the ledge 113 within the interior of the lip 110 to provide a fluid seal at the pivot joint. Further in this example, a bearing 118 is received over the top of the lip 110 and sandwiches the O-ring seal between the bearing 118 and the ledge 113. The upper stem 28 extends upward through openings in the O-ring seal 116 and the bearing 118. A bonnet or cap 120 also has a tapered opening 121 through which the upper stem section 28 passes. The cap 120 also has a disk portion 122 that bears against the bearing 118 and has a depending flange portion 124 that, in the disclosed example, threadingly engages an exterior surface 126 of the lip 110. The cap 120 can be secured in any desired manner to the housing 50, such as, for example, by a plurality of bolts, latches, or the like. The cap 120 and bearing 118 securely hold the stem pivot 27 in an assembled condition and prevent the stem 24 from inadvertently being removed or ejected from the valve 20. The bearing 118 and the interfacing surface 113 or seat permit the stem 24 to pivot about the ball 104. The frusto-conical shape of the stem housing interior 74 and the cap tapered opening 121 permit the lower stem to pivot freely through its full range of travel within the stem housing.

Figure 16:
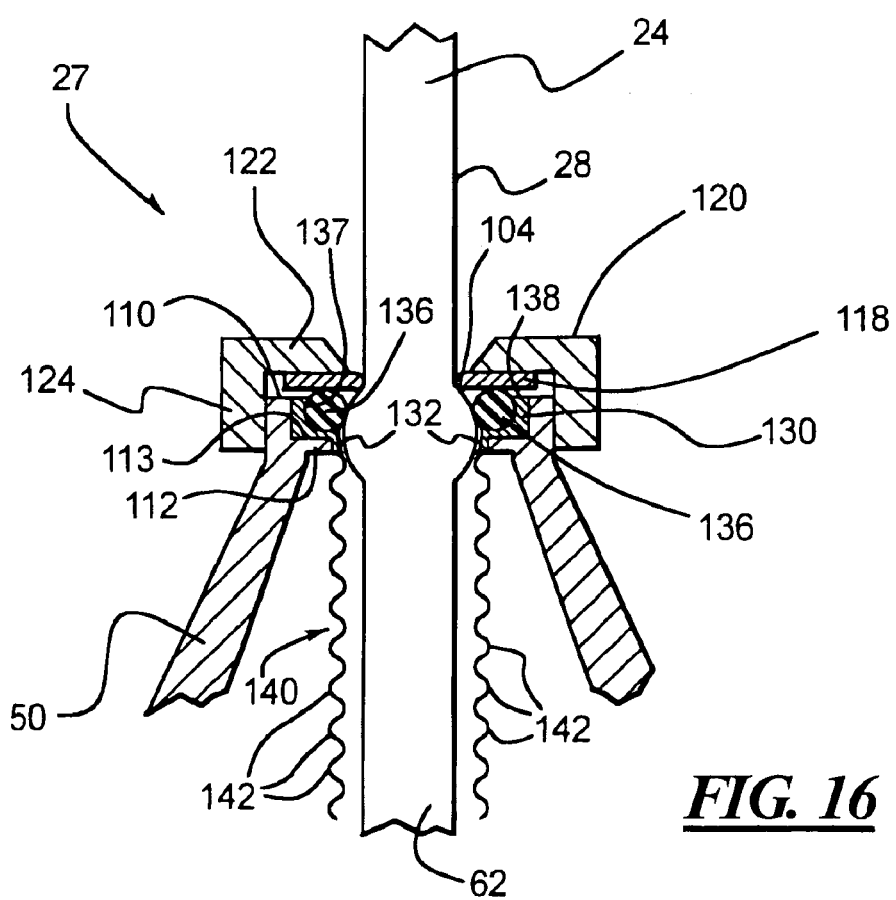
FIG. 16 is a side view in partial cross section of one example of a valve stem pivot arrangement constructed according to the teachings of the present invention.

FIG. 16 illustrates another alternative embodiment of a stem pivot 27 for the valve stem 24 and stem housing 50. In this example, the stem 24 again includes a ball 104 positioned near the pivot end of the stem housing. In this example, the stem housing 50 again is frusto-conical shaped and has an annular inward facing flange 112 and upturned lip 110 similar to the prior example. This example also discloses a cap 120 and a bearing 118 similar to the prior example. However, in this example, a lower bearing 130 is provided and has an opening 132 therethrough for receiving the stem 24. The lower bearing opening 132 defines a socket on its interior surface, wherein the socket has a shape that corresponds to the shape of the ball 104 of the stem. The socket is constructed and arranged so that the ball 104 rests and is supported by the socket surface.

The lower bearing 130 is supported on the ledge 113 of the flange 112. An O-ring 136 or packing is received within a groove 137 formed in an upper surface 138 of the bearing 130. The O-ring 136 provides a fluid seal around the ball 104 of the stem. The upper bearing 118 is again provided resting on a top surface of the lip 110 and sandwiches the O-ring 136 and the lower bearing 130 between the ledge 113 and the upper bearing. The bonnet or cap 120 is essentially identical in construction to the prior disclosed example and is received over the lip 110 and is secured in place by mechanical threads between the cap and the exterior surface 126 of the lip.

To provide a further fluid-tight seal at the stem pivot 27, a bellows or boot 140 can be received over a portion of the lower stem section 62. In this example, the bellows 140 has a plurality of convolutions 142 to permit movement of the bellows. The boot or bellows 140 can also be of a generally flat or non-convoluted and flexible construction, if desired. An upper end of the bellows 140 can be secured either to the stem 24 near the ball 104 or to the lower bearing with the lower stem section simply received through the bellows. A lower end of the bellows can tightly seat or seal against the lower stem section 62. The bellows 140 can be provided as an elongate boot substantially covering the lower stem section 62 to protect the lower stem section from contact with process fluids passing through the sleeve valve 20 that may otherwise cause damage to the material of the stem or to components of the stem pivot 27. Alternatively, the bellows 140 can be provided as a shorter length boot to simply prevent process fluid from leaking past the stem pivot 27 at the stem housing pivot end 54.

Figure 17:
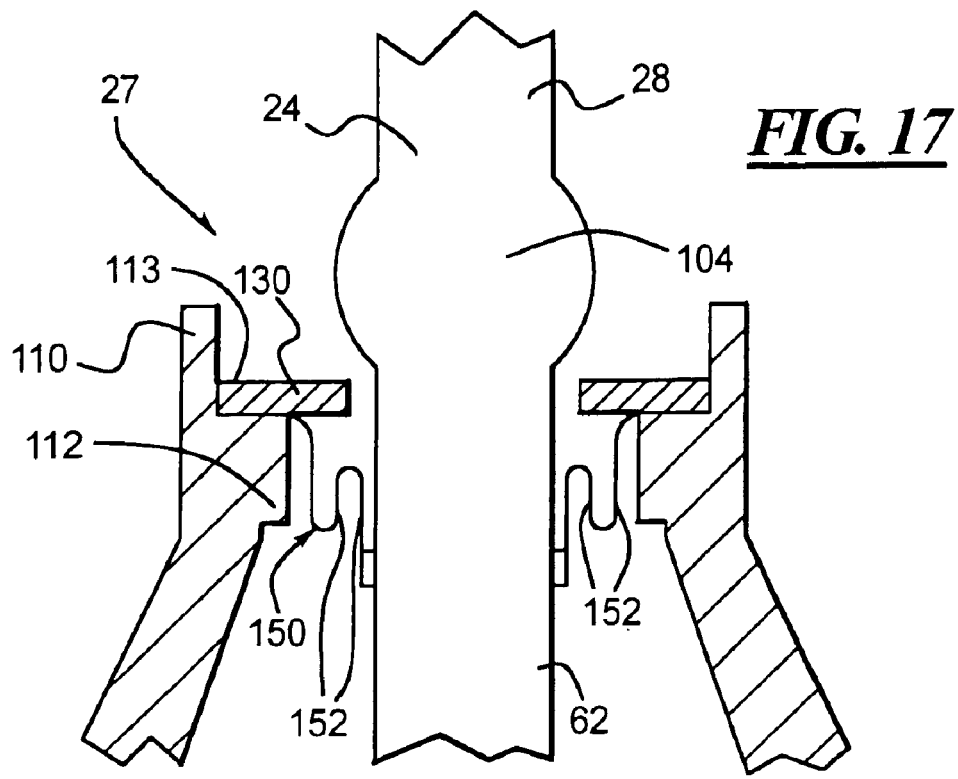
FIG. 17 is a side view in partial cross section of one example of a valve stem pivot arrangement constructed according to the teachings of the present invention.

FIG. 17 illustrates one alternative example of a portion of the stem pivot 27 for providing a fluid-tight seal. In this example, the disclosed element 130 has an alternative, shorter length bellows 150. The element 130 can be a washer sandwiched beneath the lower bearing described above with the bellows carried by or captured by the element 130. The element 130 can alternatively be the lower bearing. The element 130 can be a flexible metal disc that is received over a portion of the stem near the ball 104. The disc can be welded to a portion of the stem and/or can be welded to a portion of the ledge 113 of the flange 112. Alternatively, the element 130 as a metal disc can be appropriately sandwiched between pivot region components and be borne and sealed against the stem. The bellows 150 in this example includes only one or two convolutions 152 permitting some movement of the lower stem section about the pivot ball 104 while maintaining a fluid-tight seal. A lower end of the bellows 150 is disposed a distance from the ball 104 but not nearly as far down the lower stem section as the bellows 140 in the prior example. The lower end of the bellows 150 can again provide a fluid-tight seal around the lower stem section. An O-ring or a thickened section of material for an elastomeric boot can provide the fluid tight seal. Alternatively, the boot or bellows 150 can be formed of a metallic material, wherein the lower end of the bellows 150 can be welding or otherwise affixed around the lower stem section 62. Similarly, the upper end of the bellows 150, if formed of an elastomeric material, can be sandwiched between the lower element 130 and the ledge 113 to provide a seal when the stem pivot 27 is assembled. If a metallic bellows is used, the bellows upper end can be welded or otherwise affixed to the element 130 to form a seal. The shorter length bellows 150 can be substituted for the elongate bellows 140 in the prior example with all other components of the stem pivot 27 remaining the same.

Figure 18:
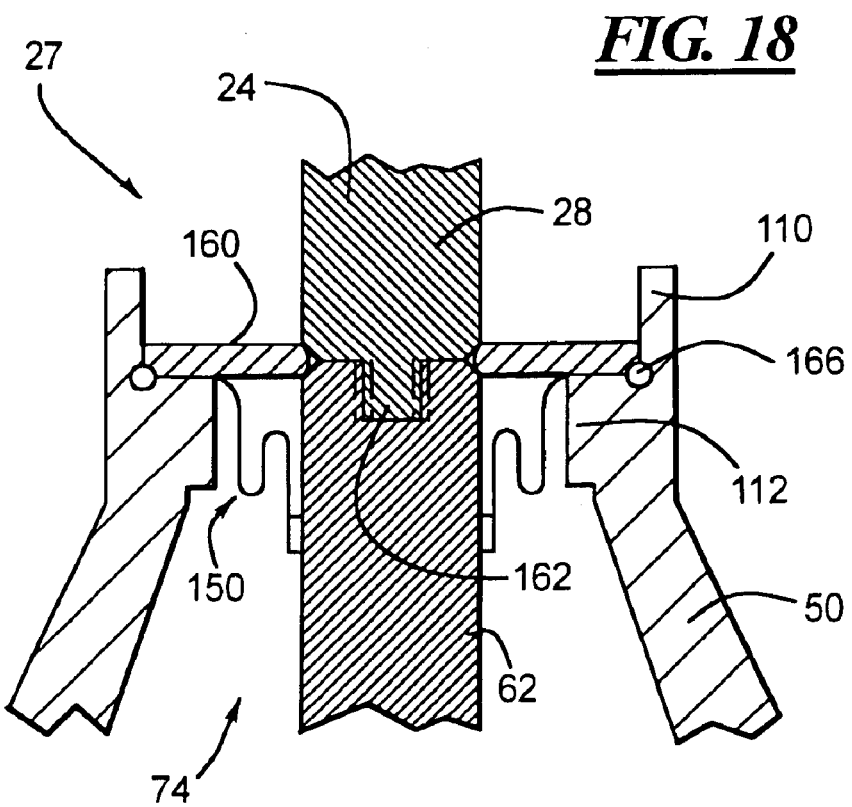
FIG. 18 is a side view in partial cross section of one example of a valve stem pivot arrangement constructed according to the teachings of the present invention.

As discussed above, the stem 24 can either be a single integral unit or can be formed of separate upper and lower stem sections. FIG. 18 illustrates such a two-piece stem 24 in one disclosed example. FIG. 18 also illustrates another alternative embodiment of a stem pivot 27 including a stand alone bearing 160 coupled to a bellows 150, as described above in the disclosed example of FIG. 17. The two-piece stem and bellows 150 can be utilized with any of the above described examples as well as with the alternative example of FIG. 18.

In FIG. 18, the disclosed upper stem section 28 can be formed of one type of material and the lower stem section 62 can be formed of a different type of material, wherein the two discrete stem sections are interconnected to one another. In the disclosed example, the upper stem section 28 includes a threaded stud 162 extending from its lower end that is received in a complementary threaded bore 164 in the upper end of the lower stem section 62. In some examples, process fluid "P" passing through the sleeve valve 20 may come in contact with the lower stem section 62 in the interior 74 of the stem housing 50, as shown. The process fluid may be of a caustic composition that can damage or degrade certain materials, such as certain metals or plastics. The lower stem section 62 can therefore be made from a suitable material that is not harmed by the process fluid "P", though such material may be quite expensive, difficult to work with, and/or relatively hard to obtain. The two-piece stem design illustrated in FIG. 18 permits the upper stem section 28 to be manufactured from a material that is different from the lower stem section and less expensive, easier to work with and/or more, readily available.

Also in the example of FIG. 18, a small bellows or boot 150 similar to that disclosed in FIG. 17 is received over the stem. A lower end of the bellows 150 sealingly engages the lower stem section 62. An upper end of the bellows 150 is suitably attached to the bearing 160 that rests on and is affixed to the ledge 113 of the inwardly extending flange 112 and within the lip 110 at the pivot end 54 of the stem housing 50. In this example, a seal such as an O-ring 166 can provide a fluid-tight seal between the outer perimeter of the bearing 160 and the ledge 113 and lip 110 of the stem housing 50. The bearing 160 defines the stem pivot 27 for the stem 24. Again, the stem pivot 27 can alternatively be assembled similar to the embodiments disclosed in FIGS. 15 and 16 utilizing an upper bearing and bonnet or cap. The bellows 150 can alternatively be adhered to a washer, a flange, or a part of the stem housing 50 as well. Also as noted above, the bellows need not be an elastomeric convoluted bellows, but instead can be a flexible metal seal, either as a convoluted part, a flexible metal disc, or the like. The bearing 160 reflects the shape of one possible example of a flexible metallic seal shape.

As will be evident to those of ordinary skill in the art, the various constructions of the stem pivot 27 and the joint components between the stem 24 and stem housing 50 can vary considerably and yet fall within the scope of the present invention. Certain examples are disclosed herein although other examples are permissible.

As will be evident to those having ordinary skill in the art, the bellows configuration and materials, the bearing shapes and materials, the stem lengths, shapes, and materials, the valve body sizes, shapes, and materials, and other components can all vary and yet fall within the scope of the invention. Metal, graphite, TEFLON or other bearing types can be utilized as desired. Metal or plastic valve bodies can be used as well. Stainless steel for the valve body, stem, and plug components is often preferable for its durability, strength, workability, and other desirable characteristics.

Although certain sleeve valve examples have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A sleeve valve assembly comprising:
   a valve body;
   a fluid passage through the valve body having an inlet end and an outlet end;
   a valve seat defined within the fluid passage;
   a stem housing extending radially from the valve body;
   a sleeve axially slidable within the fluid passage and having an upstream end, a downstream end, and an axial flow passage in communication with the inlet end and the outlet end of the fluid passage;
   a stem pivot housed within the stem housing;

a valve stem pivotally mounted at the stem pivot and partly extending through the stem housing, the valve stem being actuable to slide the sleeve between an open position with the downstream end spaced from the valve seat and a closed position with the downstream end borne against the valve seat to selectively control fluid flow through the flow passage to the outlet end; and a convoluted boot sealed tightly to the valve stem and captured by a part of the stem housing at the stem pivot.

2. A valve assembly according to claim 1, wherein one end of the valve stem is coupled to the sleeve at a joint and wherein the stem pivot accommodates relative axial movement of the valve stem as the sleeve slides within the fluid passage.

3. A valve assembly according to claim 1, wherein the valve stem has a lower stem section coupled to the sleeve at a joint that accommodates relative movement between the joint and the stem pivot in an axial direction relative to the valve stem as the sleeve slides within the fluid passage.

4. A valve assembly according to claim 1, wherein the stem pivot is defined at a pivot end of the stem housing spaced from the fluid passage.

5. A sleeve valve assembly according to claim 1, wherein the stem pivot further comprises:

a cap removably received over the pivot end of the stem housing and capturing a part of the convoluted boot between the cap and part of the stem housing.

6. A sleeve valve assembly according to claim 5, wherein the stem pivot further comprises:

a fluid tight seal captured within the cap and stem housing.

7. A sleeve valve assembly according to claim 6, wherein the fluid tight seal is one of an O-ring and a packing.

8. A sleeve valve assembly according to claim 5, wherein the stem pivot further comprises:

at least one bearing captured within the bearing region and borne against a part of the valve stem.

* * * * *

UNITED STATES PATENT AND TRADEMARK OFFICE
CERTIFICATE OF CORRECTION

PATENT NO. : 6,874,761 B2
DATED : April 5, 2005
INVENTOR(S) : McCarty et al.

It is certified that error appears in the above-identified patent and that said Letters Patent is hereby corrected as shown below:

<u>Title page,</u>
Item [73], Assignee, delete "Fisher Controls International" and insert
-- Fisher Controls International LLC --.

<u>Column 3,</u>
Line 1, insert -- to -- before "now".

<u>Column 6,</u>
Line 61, delete "therefor" and insert -- therefore --.

<u>Column 7,</u>
Line 36, delete "design" and insert -- designed --.

<u>Column 10,</u>
Line 10, delete "more," and insert -- more --.

Signed and Sealed this

Thirty-first Day of January, 2006

JON W. DUDAS
*Director of the United States Patent and Trademark Office*